(12) United States Patent
Baszucki et al.

(10) Patent No.: US 9,821,223 B2
(45) Date of Patent: Nov. 21, 2017

(54) GAME RETENTION VALUE OPTIMIZATION SYSTEM

(71) Applicant: Roblox Corporation, San Mateo, CA (US)

(72) Inventors: David Baszucki, Portola Valley, CA (US); Jared Shapiro, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 522 days.

(21) Appl. No.: 14/519,509

(22) Filed: Oct. 21, 2014

(65) Prior Publication Data

US 2016/0107086 A1    Apr. 21, 2016

(51) Int. Cl.
 *A63F 13/12* (2006.01)
 *A63F 13/35* (2014.01)
 *A63F 13/79* (2014.01)
 *A63F 13/61* (2014.01)

(52) U.S. Cl.
 CPC .............. *A63F 13/35* (2014.09); *A63F 13/61* (2014.09); *A63F 13/79* (2014.09)

(58) Field of Classification Search
 None
 See application file for complete search history.

(56) References Cited

U.S. PATENT DOCUMENTS

| | | | |
|---|---|---|---|
| 8,764,561 B1 * | 7/2014 | Lan | A63F 13/12 463/31 |
| 8,790,168 B1 * | 7/2014 | Wolters | A63F 13/12 463/1 |
| 9,132,349 B2 * | 9/2015 | Haze | A63F 13/5375 |
| 2008/0288889 A1 * | 11/2008 | Hunt | G06Q 30/02 715/810 |
| 2014/0278308 A1 * | 9/2014 | Liu | H04L 67/22 703/6 |

* cited by examiner

*Primary Examiner* — Lawrence Galka
(74) *Attorney, Agent, or Firm* — Donald R Boys; Central Coast Patent Agency, Inc.

(57) ABSTRACT

A system has a server coupled to a data repository and software executing from a non-transitory medium on the processor, the software providing a site serving games to players connected to the server, and providing discovering instances of interaction with the server by first-time players, serving links to a first percentage of the first-time players for games having known high retention value, defined as a characteristic that first-time players who play the game return to the site within a specified period of time, serving links to a remaining percentage of the first-time players for games having no well-developed retention value, marking selection by first-time players of games having no well-developed retention value, monitoring the site for return time of players having selected games having no well-developed retention value, providing a return time period, and using the return time period, assigning or amending a retention value for the game.

9 Claims, 7 Drawing Sheets

GAME RETENTION VALUE OPTIMIZATION SYSTEM

BACKGROUND OF THE INVENTION

1. Field of the Invention

The present invention is in the field of online gaming and pertains particularly to methods and apparatus for identifying and prioritizing online games with high retention value for service to new users.

2. Discussion of the State of the Art

In the art of computerized online gaming, new online games are continuously being created and submitted into gaming service systems as active and available online games. For a gaming business, one of the highest priorities is to increase or otherwise optimize the number of new or first-time users who return to the gaming site within a relative short time period following first game play.

In gaming systems, games are often categorized into generic categories like "most popular" or "longest first-time play duration". One limitation of such an approach is that these ratings or categories are largely dependent upon the majority opinion or collected activity data detailing activity of the other users that played the game at least once. Such an approach is largely generic and really does not pinpoint the "first-time" play experience appeal of a game other than highlighting first-time play duration with the assumption that longer play duration may equate to a better user experience.

It has occurred to the inventors that if games could be rated according to a retention utility factor or retention value, they could be prioritized accordingly and served to first-time users, to increase the likelihood statistically that more first-time users might be retained to continue to patronize the service.

Therefore, what is clearly needed is a system for identifying and prioritizing online games with high retention value for service to new users.

BRIEF SUMMARY OF THE INVENTION

According to an embodiment of the present invention, a gaming system is provided comprising a network-connected server having a processor coupled to at least one data repository and software executing from a non-transitory medium on the processor, the software providing a site serving games to players connected to the server, and providing discovering instances of interaction with the server by first-time players, serving links to a first percentage of the first-time players for games having known high retention value, defined as a characteristic that first-time players who play the game return to the site within a specified period of time, serving links to a remaining percentage of the first-time players for games having no well-developed retention value, marking selection by first-time players of games having no well-developed retention value, monitoring the site for return time of players having selected games having no well-developed retention value, providing a return time period, and using the return time period, assigning or amending a retention value for the game.

In one embodiment the network is the Internet network. Also in one embodiment retention value for a game is developed over a large number of instances of game play by first-time players, and noting and considering return time period for all the instances of game play. Also in one embodiment the first percentage is equal to or greater than seventy-five percent. In another embodiment a predetermined time period is established, and the system notes the percentage of first-time players for a game that return to the site within the pre-determined time frame, and the retention value is based on the percentage of first-time players for a game that return to the site within the pre-determined time frame.

In another embodiment the retention value for a game is assigned or associated to the game only after a pre-determined number of retention events are recorded for the game. In still another embodiment the game is a new game and a preliminary retention value is predicted and associated with the new game by an automated routine, to be amended as testing proceeds. In one embodiment there is further a reporting server having at least one processor and a coupled data repository and software executing from a non-transitory medium on the at least one processor, providing for processing logged retention event data and reporting real-time retention data to at least one statistics database, and reporting retention statistics to individual ones of targeted developers over the network. And in one embodiment the targeted developers receive the statistics through a browser-based developer interface installed on the device used to connect to the network.

DETAILED DESCRIPTION OF THE INVENTION

In various embodiments described in enabling detail herein, the inventors provide a system for identifying and prioritizing online games with high retention value for service to first-time users. The present invention is described using the following examples, which may describe more than one relevant embodiment falling within the scope of the invention.

Figure 1:
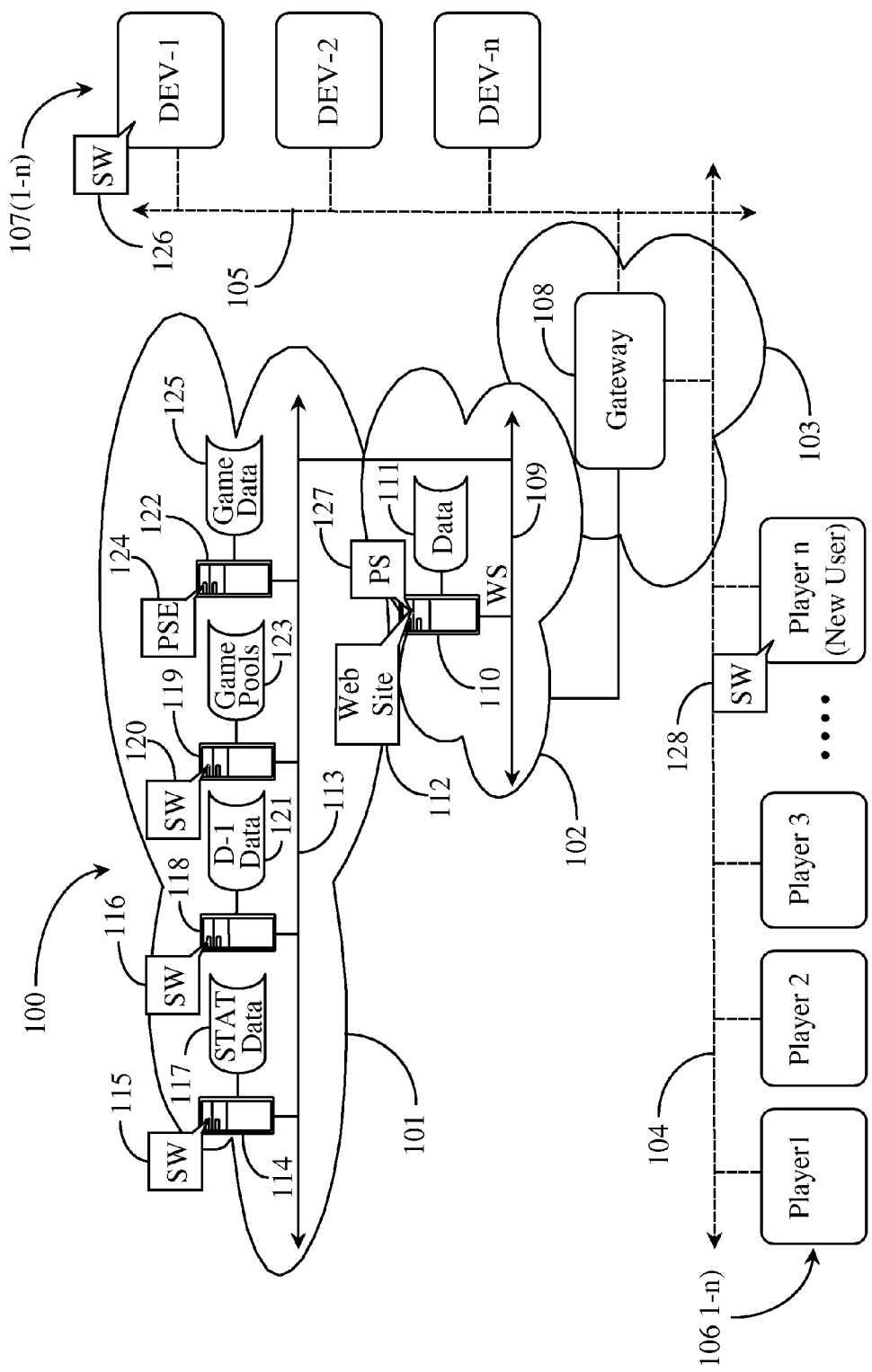
FIG. 1 is an architectural view of a gaming network supporting dynamic game presentation service according to an embodiment of the present invention.

FIG. 1 is an architectural view of a communications network 100 supporting a dynamic game presentation service according to an embodiment of the present invention. Network 100 includes a wide area network (WAN) 102. WAN 102 may be a private or public WAN without departing from the spirit and scope of the invention. WAN 102 may be the Internet network in one embodiment. WAN 102 may be referred to hereinafter in this specification as Internet 102.

Internet 102 is further characterized by an Internet backbone 109. Backbone 109 represents all of the lines, equipment, and access points that make up the Internet as a whole, including connected sub-networks. Therefore, there are no geographic limitations to the practice of the present invention.

Internet backbone 109 supports a Web server 110. Web server 110 includes a processor and at least one data repository coupled thereto and a memory containing all of the data and instruction to enable function as a Web server. Web server 110 hosts a gaming Website 112. Website 112 represents a gaming access portal for registered users and visitors of host gaming service. Users operating gaming appliances such as players 106 (1-$n$) may access server 110 and Website 112 through a communications carrier network 103. Web server 110 has connection to a data repository 111 storing client data. Client data may include any required data about clients and client accounts. Typically clients such as "players" 106 (1-$n$) register through WS 112 to gain full gaming privileges. Website 112 includes a proxy service 127 for optimizing game presentation according to categories and ratings, like most popular games, user-rated games, games having the most active players, top revenue producing games, top points producing games and so on.

Network 103 may be a cellular communications network of third or fourth generation (3G, 4G) network. Network 103 may be a wireless network like a wireless fidelity (WiFi) network without departing from the spirit and scope of the invention. In this embodiment, network 103 is a wireless access network accessible to players 106 (1-$n$) via wireless backbone 104. Backbone 104 simply illustrates wireless connectivity between players 106 (1-$n$) and a network gateway 108 within carrier network 103. Gateway 108 represents any gateway supporting full multimedia data transmission between the carrier network and the Internet network. Gateway 108 may be part of an Internet service provider (ISP) entity providing access to Internet services for network 103.

Players 106 (1-$n$) gain access to Internet 102, more particularly Website 112 hosted on Web server 110, through access network 103. In this embodiment access is wireless however wired connections may also be available. Players 106 (1-$n$) may utilize a variety of different appliances for gaming including but not necessarily limited to a laptop computer, a notebook computer, a tablet computer, a cellular telephone, an android device, a Pad device, a dedicated gaming device or computer, or any other computing appliance capable of engaging with the game service and displaying the results of play visually on the device. In this embodiment, player 106 ($n$) represents a new or first-time user.

In one embodiment a gaming appliance operated by a player such as one of players 106 (1-$n$) may include a "thin" client software application 128. Application 128 may enable automatic receipt and execution on the appliance of a game served thereto with complete scripting and instruction for automatic play. In this embodiment the game launched from the appliance is characterized as having a high retention value and the player represents a first-time player detected on the service site that has acquired SW 128 through the site.

A game service provider domain is represented in this example by a gaming provider sub network 101. Sub network 101 may be a local area network (LAN), a campus area network (CAN), or some other connected sub network without departing from the spirit and scope of the present invention. Network 101 is further characterized by a network backbone 113 having connection to Internet backbone 109. Backbone 113 may be referred to hereinafter in this specification as LAN 113. LAN 113 may support various components relative to providing a gaming service accessible through the Internet network.

In this example, LAN 113 supports a game server 122. Game server 122 includes a processor and a data repository, the processor coupled to memory storing all of the software and instruction enabling functionality as a game server. Game server 122 has connection to a data repository 125 storing game data. Game data may include images, files, scripts, and other data components required to support gaming services. In actual practice there may be separate servers for serving file data, image data, etc. for games in play on the server. Repository 125 represents data from all of these servers. Game server 122 hosts a physics engine (PSE) 124 for simulating the real-time physics of active game play.

In typical interaction players such as players 106 (1-$n$), who connect to Web server 110 and Website 112, and who have selected a game to play, are redirected to game server 122 to play the game. LAN 113 supports at least one data server 119. Data server 119 includes a processor, at least one data repository and memory storing all of the software and instruction for enabling function as a data server. Data server 119 may be adapted to maintain and serve game links to active online games that have been categorized and separated into different game pools. Server 119 has connection to a data repository 123 storing links to games in one or more game pools. Server 119 may host one or more than one game pool without departing from the spirit and scope of the invention. Likewise, the functions of server 119 may be incorporated into game server 122 without departing from the spirit and scope of the invention. Server 119 hosts software (SW) 120. Software 120 may be adapted to search game pools for high retention value game links and return them to Web server 110 for distributing to users.

LAN 113 supports a reporting data server 118. Server 118 includes a processor, at least one data repository and a memory storing all of the software and instruction for enabling function as a reporting data server capable of managing and reporting data about retention including raw data and refined or processed data. Server 118 has connection to a data repository 117. Data repository 117 stores data relative to game retention values defined in this specification as a number or a value assigned or otherwise associated to a game that reflects the number of first-time users (players) of the game that returned to the gaming site within a predefined period, typically 12 to 36 hours from the first time they played the game.

A retention event may be characterized as an event comprising minimally the enabling parameters of first game play and subsequent return to the site by the same user. For example, a retention event may minimally include the identification of the game; the identification of the player; the time record of first-time play of the game; the time record of the user returning to the site; and identification of the developer of the game. The event may also include additional information not specifically related to retention without departing from the spirit and scope of the present invention like duration of play of the game.

Proxy service 127 provides client access to one or more proxy servers, each server dedicated to managing and serving links to particular categories of games. One proxy might be a server that locates and serves links to games having high average play duration. Links to games may include developer information and visual graphics related to the game. There may be millions of games stored in the game service provider network, and game pools containing games may be created according to game categories or difference. Space games might be a category and water games might be another category. Game pools may also be categorized in other ways using other criteria like age level, popularity, user rating, etc. In this example it is desired to identify and prioritize the service of those games found to have or predicted to have high game retention characteristics.

Retention data collected through game play monitoring may be reported in one embodiment to a statistics server for processing to produce statistical data that might be made available to certain components for use in processing. Such reporting may also in one embodiment be directed to individual ones of game developers, such as game developers 107 (1-*n*). Game developers 107 (1-*n*) may also be clients or players as well. In this example, developers are separated from players in order to illustrate separate functions. Developers 107 (1-*n*) are connected by wireless backbone 105 to gateway 108 in access network 103 in this example. Developers may operate a variety of computing appliances having network access capability including a laptop computer, android device, notebook computer, smart phone, pad device, or other such computing appliances.

In one embodiment, developers 107 (1-*n*) may access Website 112 on server 110 to access feedback data on the retention figures currently logged for games they created and submitted to the system for play. In one embodiment developers may have a software application such as SW 126 downloaded from Website portal 112 executing on their appliances. One instance of SW 126 is depicted executing on device or appliance 107 (1). SW 126 may be a browser-based client integrated with developer tools and interfacing pages that may be generally available to the developers for creating and activating or submitting games to play. Developers 107 (1-*n*) may have games for which retention figures are available, and new games for which retention figures have not been developed due to a required sampling period to gain an accurate figure plus or minus an acceptable error level.

In one embodiment, data about developers already known to the system such as game data and histories of games created by the developers might be mined and utilized as input into a predictive algorithm provided to predict retention values for newer or new games. In this way, new games predicted to potentially have a high retention value might be prioritized in service while the supporting (or not) retention data is logged in the background. As retention data is logged for a newer or new game over runtime, the predicted retention value may be dynamically adjusted higher or lower based on real-time or periodic data analysis of retention event frequency.

A search function may be made a part of SW 120 for searching game pools for higher-retention-value games to serve to first-time players logging on to the service. The search function may use a pre-defined threshold retention value, for example, as part of or all of a search criterion for returning links to available games calculated as having higher retention value. Typical game search and loading operations for first-time users such as player 106 (*n*) may include serving a game page loaded with game links categorized by some common parameter like "most popular games", games that have the highest "duration of play average", top points earning games, and so on. Therefore games having high retention value and that may be prioritized for service may be largely distributed broadly across many game pool categories. Proxy server SW 127 might manage each different game pool category and the search function may return links on a single page like a custom game page where the game links are served therein from their respective pools.

To provide an example with numbers, consider that there may be, on average, 1,000,000 logged D1 events per month for all games played. It is reminded herein that a D1 event is a first-time user playing a game followed by a return to the gaming site within a certain time period by the same player. If approximately 80% of the 1,000,000 first-time players can be served high D1 retention value games for selection and play, then there would be 200,000 events (the remaining 20%) as a test pool for determining D1 retention value for individual games among the 200,000.

In one embodiment developers are rewarded for creating and submitting games having high D1 retention value. In one example, only the top three high D1 retention value games are served in a game page for a first-time user. The developers therefore benefit from repeated service of their games while D1 retention is highest.

Figure 2:
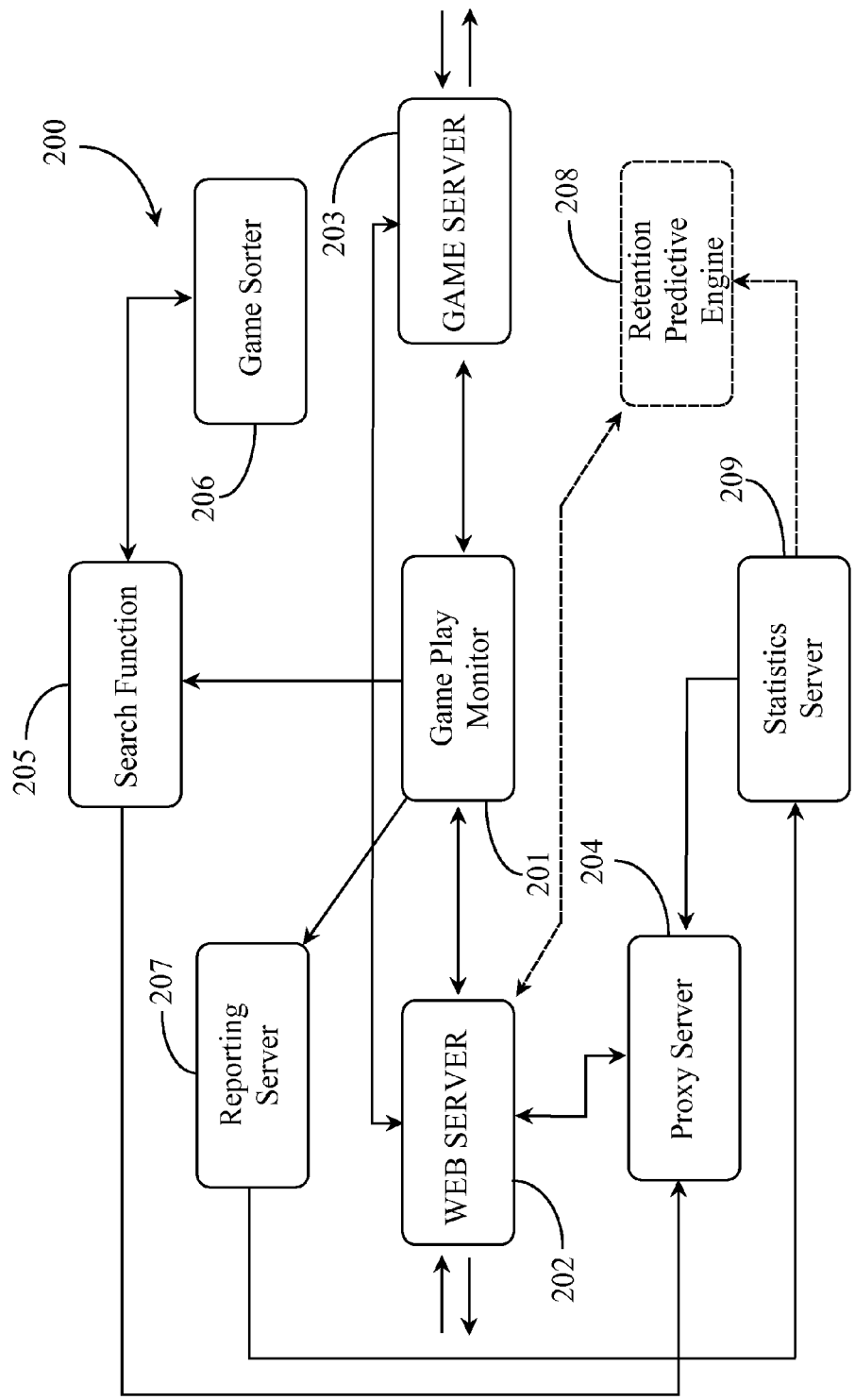
FIG. 2 is a block diagram depicting system components and component interaction according to an embodiment of the present invention.

FIG. 2 is a block diagram depicting system components 200 and component interaction according to an embodiment of the present invention. Components 200 include a game play monitor 201. In one embodiment, game play monitor 201 may be incorporated into Website 112 on server 110 of FIG. 1. In another embodiment, game play monitor 201 may reside on a game server such as game server 122 of FIG. 1. Game play monitor 201 may have access to rules or constraints that define D1 events, and may therefore log or record those events including, at minimum, the first time a game was played, the player identification, the game identification, the duration of first-time play, the time passed before return of the player to the gaming site, and identification of the developer that authored the game. It is noted herein that it is immaterial whether the returning player plays the same game, another, game, or engages in some other activity upon return to the site. The retention factor is satisfied if the player returns to the site within a specified period from first-time play of a game.

Game monitor 201 may monitor a Web server 202, analogous to Web server 110 of FIG. 1, for first-time players such as player 106 (*n*) of FIG. 1. Game Play monitor 201 may monitor game play activity on a game server 203 analogous to game server 122 of FIG. 1. Data collected and logged at both or either server may be used to define D1 retention events for games and for presenting the highest D1 retention value games to new first-time players detected at the Website. Arrow pairs depicted at Web server 202 and at game server 203 represent persons such as players and developers interacting with those servers. In one embodiment game play monitor 201 initiates a search function 205 whenever it detects a first-time player at Web server 202.

Each instance of first-time player detection made by game monitor 201 may result in an automated search (function 205) for current games enjoying the highest D1 retention characteristics. Search function 205 may be part of proxy service 127 described further above. Components 200 include a proxy server 204 analogous to proxy service 127 on server 110. Proxy 204 may search existing pools of games having known D1 retention value. One search may encompass more than one pool of games that are in the system. Proxy server 204 may return game links for sorting. Proxy server 204 may reside on Web server 110 (website) or as part of SW 120 executing on server 119 of FIG. 1 without departing from the spirit and scope of the invention.

Search function 205 may utilize or include a game sorter 206. Game sorter 206 may sort games according to presentation requirements such as the top three D1-retention value games, or a single D1 retention value game that in one embodiment may be automatically packaged with scripts and served ready to execute and play in an automated fashion to a first-time player operating a mobile gaming appliance with a "thin" client gaming application installed, such as SW 128 executing on player 106 (*n*) of FIG. 1.

Game play monitor 201 may feed a reporting server component 207. Reporting server 207 may be analogous to server 118 of FIG. 1 executing SW 116. Reporting server 207 may report D1 retention value data and other relative data to a statistics server 209 analogous to server 114 of FIG. 1 executing SW 115. Statistics server 209 may provide statistics to proxy service 204 to aid in determining the latest updates to high retention games having links available through the server.

In one embodiment components 200 may include a retention value predictive engine 208 that may be adapted to predict a D1 retention value for a new game based on known data about the game developer and data about games developed by the developer, including the D1 retention values of those games. Engine 208 may be adapted to supply, as a result of statistical analysis, a predictive D1 retention value for a new game ready for submission. In one example a developer may submit a new game for pre-play to an interface of the website like a "build club", the developer including his or her own prediction for D1 retention value for a particular game. In this variation, the engine may "validate" or contribute a "confidence" variable to the developers prediction. In one embodiment, sampling delays might be reduced or eliminated by predicting a D1 retention value to start for a new game with no previous history.

In a predictive embodiment, game monitor 201 may collect actual D1 retention value data as well as other data during active game play and log the collected data and or forward the data to reporting server 207. As more data is discovered during run of the high D1 value game having a predictive D1 retention value, the predicted value may be dynamically adjusted higher or lower depending on analysis of developing real data without departing on the spirit and scope of the present invention.

In a predictive embodiment, a formula (algorithm) may be provided to create an average statistic for all D1 retention value events for all games authored by a particular developer that have history. In one variation of the embodiment the average is a game-average value and may be supplied as a predicted D1 retention value for a new game not yet having history. Other factors may also be considered in predicting a D1 retention value for a game, such as counting the number of "first-time play" duration events for all of the developer-authored games having history. The number might be constrained to a number that must be higher than a threshold number to be included in the count.

Real-time data analysis of D1 events occurring during game play may project an upward or downward direction or trend of actual D1 retention value for a game by logging the number of D1 instances over time and noticing trends or peaks and waning periods or patterns. Periodic corrections may then be made to the predicted value until enough data exists to drop the prediction and substitute an actual value for the predicted value. Otherwise, new games may be monitored during play for a period of time before accurate D1 retention value statistics are obtained in sufficient quantity to assign an accurate or fairly stable D1 retention value. D1 retention value may be expressed as a whole number or as a ratio like 100 events logged of a total number of engagements like a thousand plays. The value might be expressed as a simple percentage without departing from the spirit and scope of the invention. In the above example it would be 10%. Of course it is desirable to serve only games with high D1 retention values to first-time users, as D1 retention is associated with positive user experience, where the higher value reflects more instances of that experience for a game and for a developer that created the game.

Figure 3:
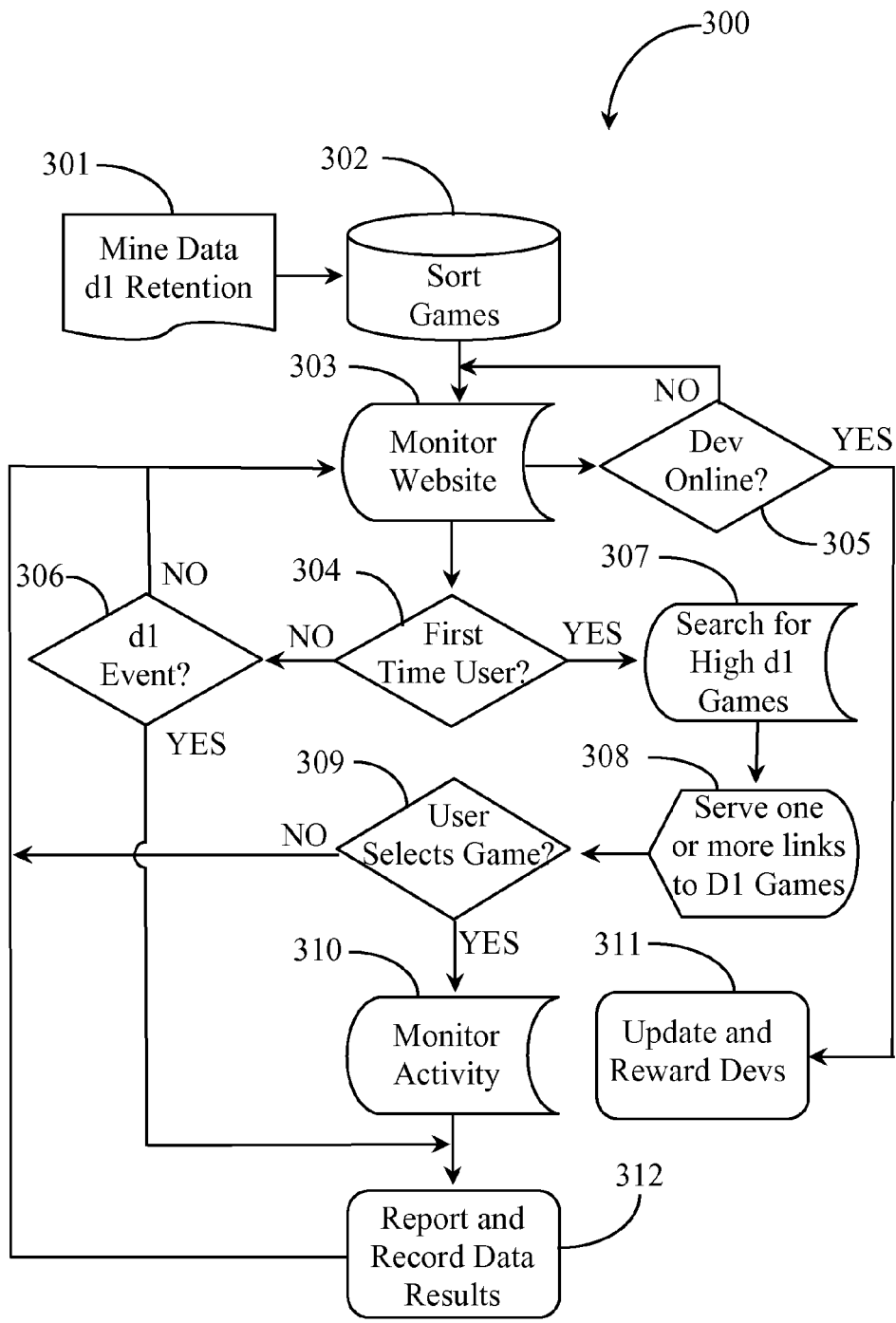
FIG. 3 is a process flow chart depicting steps for dynamic discovery and presentation of high retention games according to an aspect of the present invention.

FIG. 3 is a process flow chart depicting a process 300 for dynamic discovery and presentation of high D1 retention value games according to an embodiment of the present invention. Process 300 may begin by mining data for all games, whether the games have play histories or not, for D1 retention events at step 301. Data collected to determine a D1 retention value might include collection of sufficient data to identify the developer, the game including the game category or game pool, and the player that caused the event. It is reminded that a D1 event is constrained by a time period within which there must be a first play of a game followed by a return to the gaming site by the same player. A detection of the return of a first-time user that played a game within a minimum amount of time expiring after the play was logged marks the forming of a D1 event. For example, a player first plays the game at 1:00 PM on Day 0 (first-time player validated). If that player were again detected at the gaming site at 4:00 PM the following day, a D1 event would be logged for that game and may include information at least identifying the developer of the game, and optionally the player.

At step 302, a game sorter may be used to sort games according to some D1 game classification or hierarchy. Games may be stored by several different criteria, however the games exhibiting a qualifying D1 retention value may be sorted into virtual pools or may remain in existing game pools without departing from the spirit and scope of the invention. D1 retention value numbers may change periodically as more events are logged during game play. At step 303, a monitoring application monitors the website portal for first-time players. At step 304, it is determined if there is a new or first-time user. If there is no first-time user detected at step 304 the process may move directly to step 306 where it may be determined if there is a D1 event to record. If no D1 event is available for recording at step 306, the process may loop back to monitoring in step 303.

If it was determined at step 306 that there is one or more D1 events for recording, the process may move to step 312 where the results are recorded and reported. The process may loop back to step 303 to look for first-time users. Referring now back to step 304, if a first-time user is detected on the website, the process may move to step 307 for searching for and returning qualifying D1-retention games that might be returned to the user. The search may include accessing and searching one or more game pools. At step 308 one or more links to games having the desired high D1 retention value may be served to the first time user or player. It is important to distinguish that the first-time player has taken the appropriate registration or other steps to be qualified to play games on the game server.

At step 309 it may be determined whether the first-time player has selected or executed one of the links served at step 308 to play a high-D1 retention game. If the player determines not to select a high-retention-value game at step 309, the process may loop back to step 303 for monitoring the Website. If the first-time user determines to execute a game link served at step 308, then that player is redirected to the game server for play. Game play activity is monitored at step 310. Results of monitoring for D1 events are recorded and reported to other components that use the data at step 312.

One destination is a statistics server. A statistics server analogous to server 114 of FIG. 1 may process day 1 retention value data collected through monitoring game activity and site access statistics. Feedback may be reported or otherwise made available to developers through a user interface. Feedback data is the developer's own data about D1 retention value of the games created and may include various statistical summaries and presentation views such as a bar graph depicting game retention data for one or more games the developer has in the system. The process resolves back to Website monitoring at step 303.

In one aspect, during website monitoring at step 303, it may be determined at step 305 if one or more developers are logged into the service and are online. If it is determined that no targeted developers are logged in at step 305, the process may loop back to step 303 for further monitoring. If it is determined that one or more developers are logged into the service at step 305, the process moves to step 311 where developers owed current data are updated and, in one embodiment, rewarded for creating games with higher D1 retention characteristics. For example, three developers may be featured on a 3-game default landing page (served to first-time users). Such a page includes the links to play the top 3 D1 retention games on that page. A higher retention value for a game may result in more service to players and more exposure for the games and developers.

A game landing page may be loaded with fewer or more than three high D1 retention value games without departing from the spirit and scope of the invention. A game page may present the top three D1 games according to category where one or more game categories are presented on a default landing games page for selection.

Figure 4:
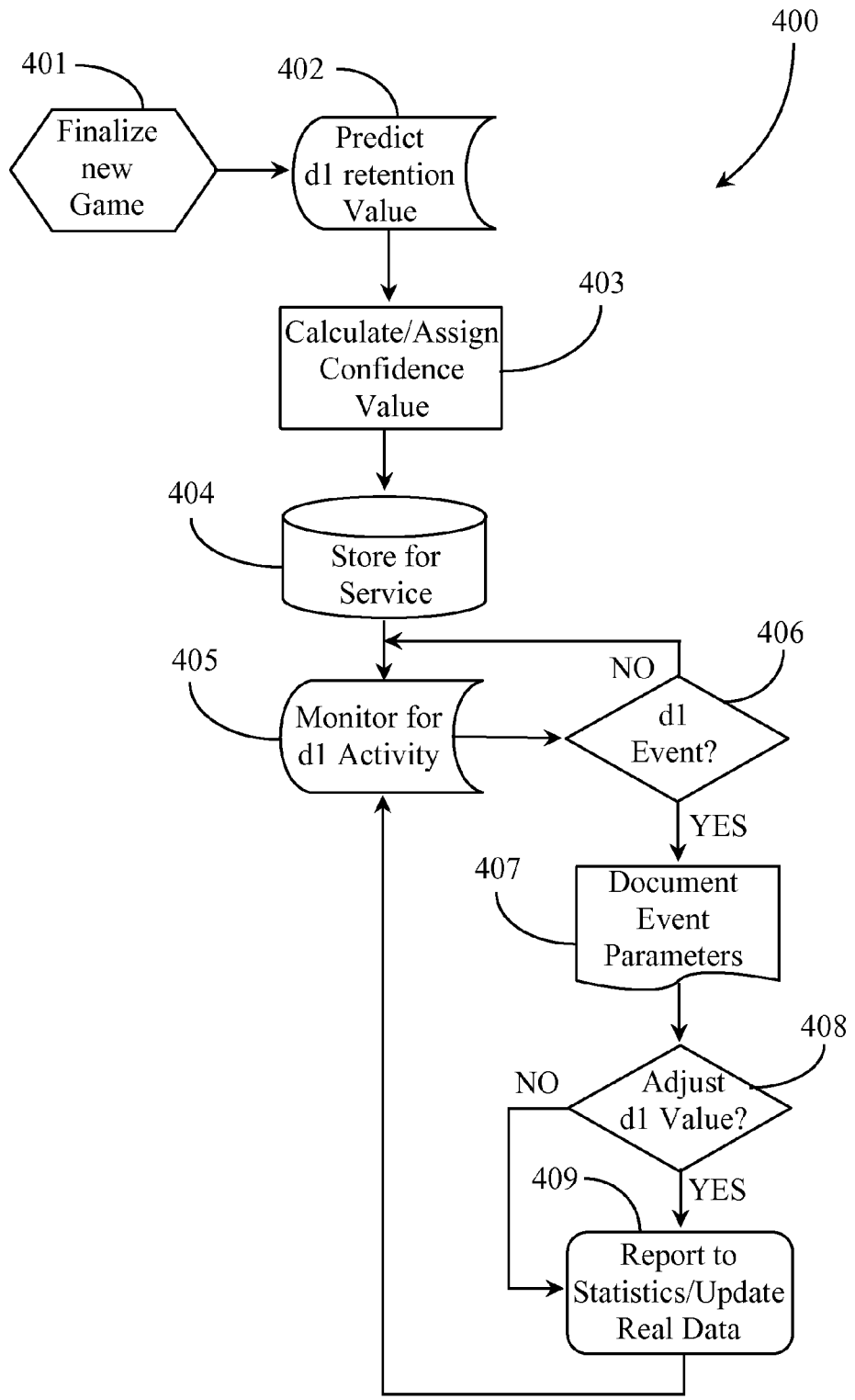
FIG. 4 is a process flow chart depicting steps for predicting retention for new games according to another aspect of the present invention.

FIG. 4 is a process flow chart depicting a process 400 for predicting retention for new games according to another aspect of the present invention. In one aspect of the invention a D1 retention value might be predicted for a new game with no logged data history. A step 401 a developer may finalize a new game for deployment on the game service. At step 402, a D1 retention value may be predicted for the game. In one aspect, the developer inputs a predicted D1 retention value at step 402 based on the developer's knowledge about other D1 retention value games he or she has created. In another aspect, the service may, using a predictive algorithm, predict a D1 retention value for the new game assigning the value to the game before service. This process may use statistics about the developer and other games the developer has created and deployed on the service.

At step 403 the service may calculate and assign a confidence value to the predicted D1 retention value for the new game of step 401. This may be performed in the event the developer has initially submitted a prediction to strengthen the final prediction using statistics. This step may be unnecessary if the service is predicting the value on behalf of the developer. Steps 402 and 403 are not required in order to practice the present invention. It is not required to predict a D1 retention value for a new game in order to practice the present invention. Predicting a value for a new game with some accuracy may serve to reduce the time it takes for the game to be loaded as a high retention game and served to first-time users.

At step 404 the new game is stored for service. With the predicted value the game is searchable and may be served as a high D1 retention value game according to the actual value even though no history yet exists for the game. At step 405 the service may monitor game play of the new game for D1 activity. At step 405 it is assumed that the new game of step 401 with the predicted value has been served, selected for play and is active on the game server. At step 406, the service determines if there has been a D1 event detected during monitoring. A D1 event is an instance of a first-time player of a game coming back to the gaming site again within a relatively short time span such as between 12 and 36 hours. The service may monitor in real time or check periodically.

Player identification and the game identification are key to determining whether a D1 event has occurred. If the player is not listed in game play history, then the player is added as a first-time player on that game. Upon next detection of that player at the gaming site, regardless of activity of the player, within the allotted time window for D1 retention of games, the D1 event may be recorded for that game. At step 406 if no D1 event is detected the process loops back to monitoring game play.

If a D1 event is detected at step 406, then the service records the event parameters at step 407. Event parameters may include identification of the player responsible for the event, the game identification, identification of the game author, and more detailed timestamp information marking the game play time and duration and the time of detection of the player on the gaming site again. D1 events may be tallied per game over time. Steps 405, 406, and 407 may be performed on a continuous basis or periodically to identify and document D1 events.

At step 408 a determination may be made as to whether or not to make an adjustment to the predicted D1 retention value for a game. If at step 408 it is determined to adjust the predicted retention value, it is adjusted according to results of documented D1 activity over a specific time period. For example, if currently logged D1 retention data for a game for the time period supports a higher retention value, then the current value might be adjusted upward. If not then the value may be left the same or adjusted to a lower value.

In one embodiment D1 retention events may be documented against a specified period of time. In such a case having x number of documented D1 events occurring within the time frame or frequency of events may help determine whether to adjust the predicted value or not, and if so, how much. After a longer period of time enough actual D1 retention data may be documented for a game to be assigned a real D1 retention value replacing the predicted value.

Updated D1 data may be reported to a statistics application for processing to produce feedback summaries describing at least the D1 retention characteristics for all of the games created by a particular developer. The developer may see through an interface executing on a connected appliance what games are doing well or not relative to D1 retention. Games exceeding expectation may be served more often to first-time users to help increase the average retention values for the games.

The process resolves back to step 405 for further monitoring for D1 events. In one embodiment a rule might be created that forces inclusion of three different developers and their high D1 retention games on a default landing page served to new first-time users detected on the website and pre-approved to play. In one example only three games are served on the page, one for each of the three developers. In one embodiment a page may include one or more games having actual D1 retention values and one or more having predicted D1 values.

In other embodiment there may be more than 3 games represented on a default landing page served to first-time users. For example there may be 6 games, two each for each of the three represented game developers. Selection of any game on the page redirects the player to the game server where game play activity might be monitored in one embodiment.

Figure 5:
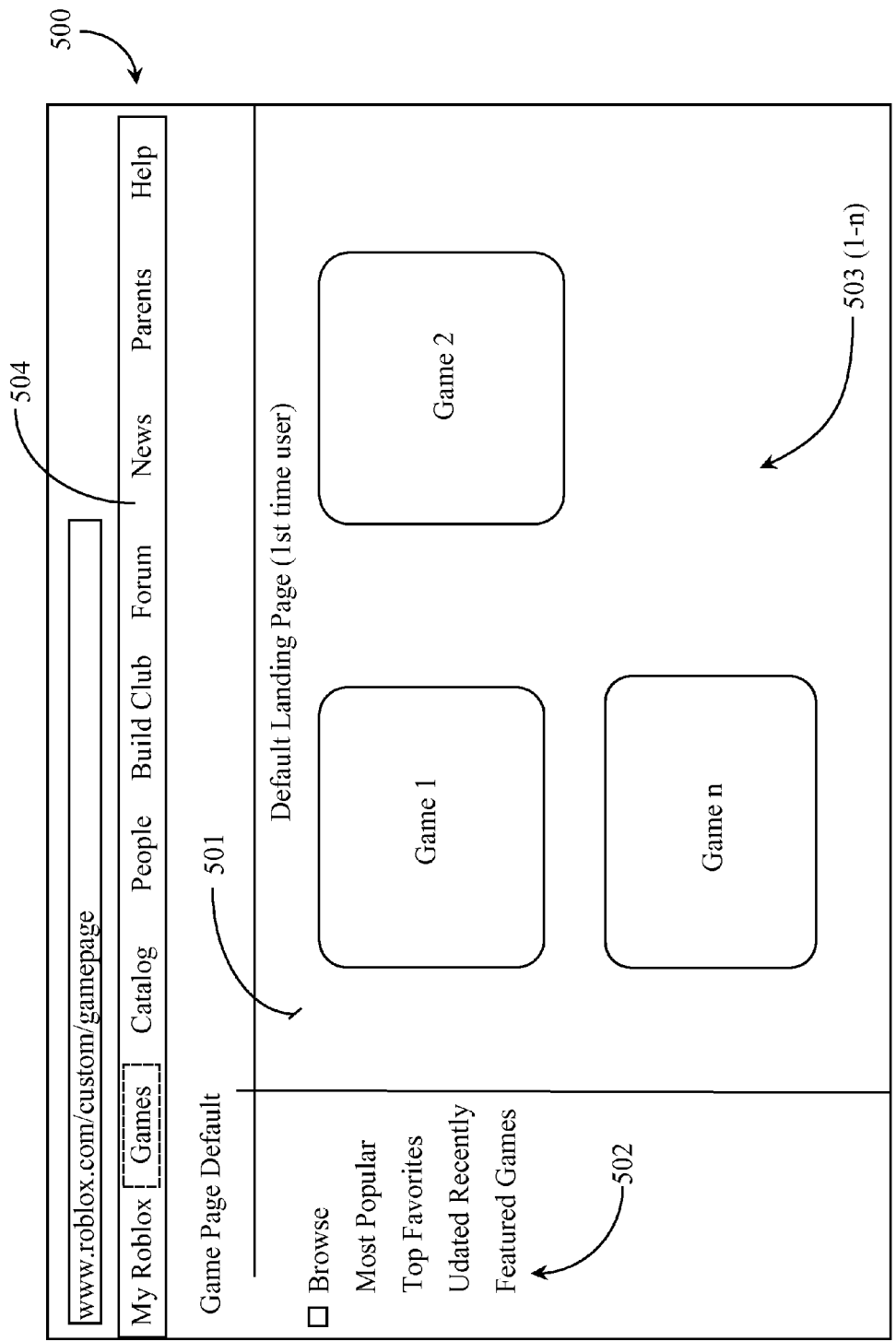
FIG. 5 is a front view of a default landing page for presenting at least three high retention games.

FIG. 5 is a view of a landing page 500 presenting at least three high-retention-value games to a first-time player. Landing page 500 may be loaded with high retention-value games dynamically. Landing page 500 includes at least one game window 501 (full screen). Game window 501 includes loaded game links 503 (1-n). In one embodiment only three of the highest D1 retention-value games found in a search are loaded onto landing page 500, each game authored by a different developer.

Landing page 500 may be a default page that is served every time a first-time user approved for game play is detected on the website. Other categories of game pages may be available such as most popular games, top favorites, recently updated, featured games, and so on. Players, including a first-time player executing one or more links loaded in a sidebar 502 on landing page 500, might browse through such categories described above. Landing page 500 is a browser-based page that may be served to a browser application such as SW 126 on appliance 107 (1) of FIG. 1.

In this example, page 500 includes a typical navigation bar 504 and links to other sections of the game service. The link Games is currently presented as depicted by broken boundary. Other links may include those to a catalog, to people, to a build club (for developers), to a forum, to gaming news, to parents (of children on the site), to a help page, and to other pages provided by the service.

Games 503 (1-n) may be presented in hierarchical order based on current D1-retention-value of each game. The order may be ascending or descending order. In one embodiment fewer or more than three games might be presented on landing page 500. In one embodiment a default landing page may be dynamically created according to any current or created game category that a player requests wherein the top three D1 retention value games for the requested category are served. Game links 503 (1-n) may also be the top three D1 retention value games across all of the available game categories.

In one embodiment, a special "game sort" is performed when a "new" or "first-time" player is detected on the service and approved to receive a landing page with game links. The sorting may simply serve, by default, the top three D1-retention-value games to that player. In one embodiment the game sort may be governed by additional constraints, such as only highest three D1-retention-value games from a category of games. In a variation of this embodiment, the player selects the category of games and the selection of the category triggers a search for high D1-retention-value games in that category. The game sort operation may sort out or highlight one or more of links to the highest D1-retention-value games in the category for presentation to the user.

Figure 6:
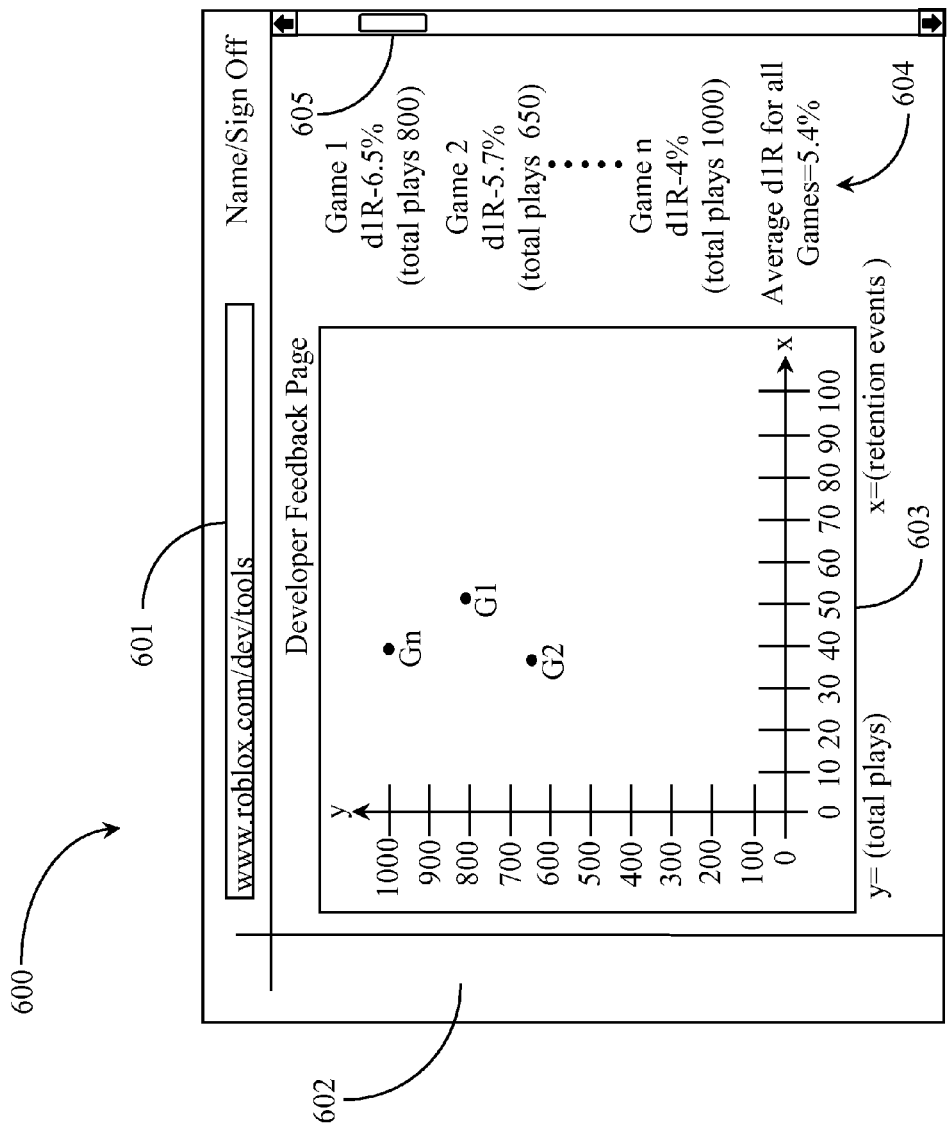
FIG. 6 is a front view of a developer feedback page for providing updates and feedback about game retention to individual game developers.

FIG. 6 is a view of a developer feedback page 600 for providing updates and feedback about game retention to individual game developers. Developer (DEV) feedback page 600 may be a browser-based or supported page served to a developer UI such as SW 126 on DEV appliance 106 (1) of FIG. 1 above. Feedback page 600 may be designed primarily to serve feedback information and insights about D1 retention numbers for games the developer has authored. Feedback page 600 may also include other types of feedback about games created by the developer without departing from the spirit and scope of the invention. Minimally, D1 retention feedback is served to developers that have D1 retention games in the system.

Landing page 600 includes a navigation bar 601, a page scroll bar 605, and a sidebar area 602. Landing page 600 includes a bar graph 603. Bar graph 603 represents just one of many types of media and presentation models that might be used to provide active feedback to the game developer. Bar graph 603 plots the current retention values for games G (1-n) on an x/y axis. The y-axis=total plays from 0 to 1000 and the x-axis=number of retention events logged from 0 to 100. Text feedback may also be provided as depicted herein by text feedback 604 including summary data about retention value for each game on graph 603.

Game 1 has 800 total plays and just over 50 retention events logged for a 6.5% retention value. Game 2 has 650 total plays and 38 retention events logged for a 5.7% retention value. Game n has 1000 total plays and 40 D1 retention events logged for a retention value of 4%. Data 604 includes a D1-retention value averaged over games 1-n of 5.4%. Actual game-retention values may be higher or lower than those depicted herein without departing from the spirit and scope of the invention. In one embodiment D1 retention statistics may be normalized, such as an average daily retention value for a game or an average weekly retention value for a game. Average for a game might be normalized to 1.0 and the next whole number may represent a multiple of the average such as 2× (average), and so on.

One with skill in the art of data presentation in multiple media types will appreciate that there is no limit to the variety of graphs, charts, images, summary blocks, or text data blocks that may be used to present D1 retention information. In one embodiment the developer may gain additional insights through feedback such as player demographics tied to retention events for example. Developers may also be rewarded for creating and submitting top D1 retention games for service to first-time users. They may receive free credits for merchandise, free game accessories, and other like rewards. Higher-retention games are promoted more in this system benefiting developers with more game exposure due to better game discovery.

Figure 7:
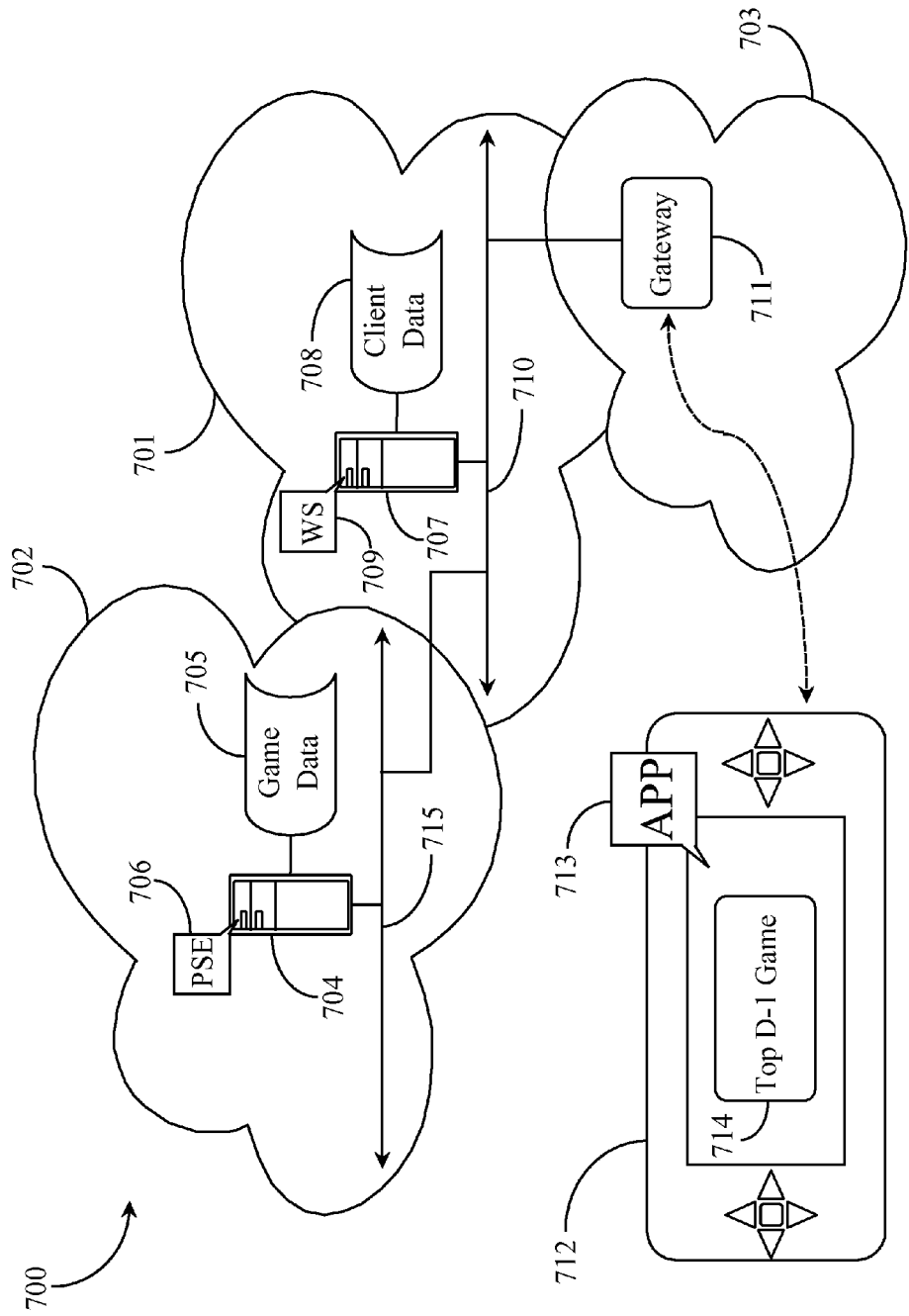
FIG. 7 is an architectural view of a gaming network supporting presentation immediately followed by auto launch of a single high retention game to a mobile device running a client application.

FIG. 7 is an architectural view of a gaming network 700 supporting presentation immediately followed by auto launch of a single high retention value game to a mobile device running a client application. Network 700 is analogous in description to network 100 of FIG. 1. In this example, a user detected as a first-time player connects to the service using a mobile game appliance 712 having wireless connectivity through carrier network 703 (analogous to network 103 of FIG. 1), gateway 711 (analogous to gateway 108), Internet backbone 710 (analogous to backbone 109), to Web server 707 (analogous to WS 110) running Website 709 (analogous to WS 112).

The user operating appliance 712 is a first-time player connected to Website 709. In one embodiment, the player has an application (APP) 713 executing on the appliance. APP 713 may be a thin-client application that enables receipt of a single prepackaged game that is ready for play including the scripts for game launch and play. In this example, when the player is detected and approved to play, the service may conduct a search for the top D1-retention-value game for a category or across categories, and dynamically load it including required scripts for automated download and at least launch of game 714 on mobile gaming appliance 712.

In one embodiment automatic play ensues with server support once the game is downloaded to APP 713 on mobile gaming appliance 712. Server support for the game has been provided in the background transparently to the player. A game provider network 702 analogous to network 101 of FIG. 1 supports a game server 704 and PSE engine 706 analogous to their counterparts of FIG. 1 namely server 122 and PSE 124. Repository 705 containing game data is analogous to repository 125 of FIG. 1. In one embodiment game 714 includes all of the scripting and instruction to play a game with some physics processing support distributed to the mobile gaming appliance via application 713. In this scenario the player is also connected to PSE 706 during active play and for monitoring purposes relative to statistics including D1 retention statistics.

It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A system comprising:
a network-connected server having a processor coupled to at least one data repository and software executing from a non-transitory medium on the processor, the software providing a site serving games to players connected to the server, and providing:
a game engine storing a plurality of games for serving to players, individual ones of the games having an associated game retention value (GRV), based upon a number of first time players that returned to the gaming site within a pre-determined time period, after playing the subject game, the GRV being higher for a higher number of first-time players returning, and individual ones of the games having no associated GRV, a first-time player being a player that has registered to the site, but has no history of having played a game;
through execution of the software, tracking, among a plurality of players logged into the site, a set of the plurality of the players that are first-time players;
serving links to a first percentage of the first-time players enabling the first percentage to enter and play games having a GRV at or above a predetermined value;
serving links to a remaining percentage of the first-time players enabling the remaining percentage to enter and play games having no associated GRV;
tracking both the first percentage and the remaining percentage of the first-time players for leaving the site, and monitoring the site for return time of the same players to the site; and
using the return time period for each player returning to the site, assigning or amending a GRV for the game that was played by each player.

2. The system of claim 1, wherein the network is the Internet network.

3. The system of claim 1 wherein GRV for a game is developed over a plurality of instances of game play by first-time players, and noting and considering return time period for all the instances of game play.

4. The system of claim 1 wherein the first percentage is equal to or greater than seventy-five percent.

5. The system of claim 1, wherein a predetermined time period is established, and the system tracks a percentage of first-time players for a specific game that return to the site within the pre-determined time frame, and the GRV is based on the percentage of first-time players for the specific game that return to the site within the pre-determined time frame.

6. The system of claim 1, wherein the GRV for a game is assigned or associated to the game only after a pre-determined number of first-time players are tracked and recorded as having returned to the site after playing the game.

7. The system of claim 1, wherein one of the games of the plurality is a new game, and a preliminary retention value is predicted and associated with the new game by an automated routine, to be amended as play and tracking proceed.

8. The system of claim 1, wherein the fact of a first-time player playing a game, leaving the site, and returning to the site, is recorded as a retention event, including identification of the game and the time to return to the site, and retention events data and statistics are reported to individual ones of game developers.

9. The system of claim 8, wherein the game developers receive the statistics through a browser-based developer interface installed on a computerized device used to connect to the network.

\* \* \* \* \*